US011176588B2

(12) United States Patent
Licht et al.

(10) Patent No.: US 11,176,588 B2
(45) Date of Patent: Nov. 16, 2021

(54) NETWORK-BASED INVENTORY REPLENISHMENT

(71) Applicant: NCR Corporation, Duluth, GA (US)

(72) Inventors: Yehoshua Zvi Licht, Alpharetta, GA (US); Brent Vance Zucker, Roswell, GA (US)

(73) Assignee: NCR Corporation, Atlanta, GA (US)

( * ) Notice: Subject to any disclaimer, the term of this patent is extended or adjusted under 35 U.S.C. 154(b) by 546 days.

(21) Appl. No.: 15/444,246

(22) Filed: Feb. 27, 2017

(65) Prior Publication Data

US 2018/0204267 A1    Jul. 19, 2018

Related U.S. Application Data

(60) Provisional application No. 62/446,566, filed on Jan. 16, 2017, provisional application No. 62/446,577, filed on Jan. 16, 2017.

(51) Int. Cl.
*G06Q 30/06*     (2012.01)
*G06Q 10/08*     (2012.01)

(52) U.S. Cl.
CPC ....... *G06Q 30/0631* (2013.01); *G06Q 10/083* (2013.01); *G06Q 10/087* (2013.01); *G06Q 30/0613* (2013.01); *G06Q 30/0635* (2013.01)

(58) Field of Classification Search
CPC ........... G06Q 30/0631; G06Q 30/0635; G06Q 30/0613; G06Q 10/083; G06Q 10/087
USPC ................................................ 705/26.1–27.2
See application file for complete search history.

(56) References Cited

U.S. PATENT DOCUMENTS

| 6,963,851 | B1 * | 11/2005 | Szabo | G06Q 30/02 |
| | | | | 186/56 |
| 8,924,262 | B2 * | 12/2014 | Shuster | G06Q 30/0601 |
| | | | | 705/26.1 |
| 2013/0204815 | A1 * | 8/2013 | Grothmann | G06N 3/08 |
| | | | | 706/16 |

OTHER PUBLICATIONS

Carbonneau, Real; Kevin Laframboise, Rustam Vahidov, "Application of machine learning techniques for supply chain demand forecasting", European Journal of Operational Research, vol. 184, Issue 3, 2008 (https://www.sciencedirect.com/science/article/pii/S0377221706012057) (Year: 2008).*

* cited by examiner

*Primary Examiner* — Anand Loharikar
(74) *Attorney, Agent, or Firm* — Schwegman, Lundberg & Woessner

(57) ABSTRACT

A network-based inventory replenishment application maintains and analyzes item transactions on a per-consumer basis. Specific item purchases are calculated as being in need of replenishment by a specific consumer on specific future dates or a specific range of future dates. The consumer is proactively informed and asked if such items should be ordered. The network-based inventory replenishment application engages the consumer for item replenishment and item order processing over a plurality of disparate communication channels.

7 Claims, 18 Drawing Sheets

The same quantity purchased every single time for all items.

| | 1 | 2 | 3 | 4 | 6 | 10 | 12 | 20 | 21 | 24 | 40 |
|---|---|---|---|---|---|---|---|---|---|---|---|
| avocado | 0 | 0 | 0 | 0 | 153 | 0 | 0 | 0 | 0 | 0 | 0 |
| Baking powder | 8 | 0 | 0 | 0 | 0 | 0 | 0 | 0 | 0 | 0 | 0 |
| banana | 0 | 0 | 0 | 219 | 0 | 0 | 0 | 0 | 0 | 0 | 0 |
| BBQ sauce | 8 | 0 | 0 | 0 | 0 | 0 | 0 | 0 | 0 | 0 | 0 |
| Beef | 45 | 0 | 0 | 0 | 0 | 0 | 0 | 0 | 0 | 0 | 0 |
| Beer | 0 | 0 | 0 | 0 | 0 | 0 | 0 | 0 | 17 | 0 | 0 |
| bread | 0 | 127 | 0 | 0 | 0 | 0 | 0 | 0 | 0 | 0 | 0 |
| Carrots | 79 | 0 | 0 | 0 | 0 | 0 | 0 | 0 | 0 | 0 | 0 |
| Cashew Nuts | 32 | 0 | 0 | 0 | 0 | 0 | 0 | 0 | 0 | 0 | 0 |
| cheese cream | 55 | 0 | 0 | 0 | 0 | 0 | 0 | 0 | 0 | 0 | 0 |
| chicken | 0 | 0 | 0 | 0 | 0 | 167 | 0 | 0 | 0 | 0 | 0 |
| chips | 0 | 0 | 0 | 0 | 63 | 0 | 0 | 0 | 0 | 0 | 0 |
| coffee | 0 | 0 | 0 | 0 | 0 | 0 | 0 | 0 | 0 | 33 | 0 |
| cornflakes | 80 | 0 | 0 | 0 | 0 | 0 | 0 | 0 | 0 | 0 | 0 |
| cottage cheese | 98 | 0 | 0 | 0 | 0 | 0 | 0 | 0 | 0 | 0 | 0 |
| cucumber | 132 | 0 | 0 | 0 | 0 | 0 | 0 | 0 | 0 | 0 | 0 |

FIG. 1G

| Gap (Days) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| avocado | 0 | 0 | 0 | 15 | 32 | 36 | 32 | 17 | 9 | 6 | 3 | 2 | 0 | 0 | 0 | 0 | 0 | 0 | 0 | 0 | 0 | 0 | 0 | 0 | 0 | 0 | 0 | 0 |
| banana | 14 | 20 | 35 | 33 | 42 | 32 | 36 | 5 | 1 | 0 | 0 | 0 | 0 | 0 | 0 | 0 | 0 | 0 | 0 | 0 | 0 | 0 | 0 | 0 | 0 | 0 | 0 | 0 |
| Beef | 0 | 0 | 0 | 0 | 0 | 0 | 0 | 0 | 0 | 0 | 0 | 0 | 0 | 0 | 0 | 0 | 0 | 5 | 12 | 5 | 7 | 4 | 4 | 2 | 2 | 3 | 0 | |
| bread | 0 | 0 | 0 | 0 | 9 | 26 | 33 | 18 | 11 | 11 | 9 | 7 | 2 | 0 | 0 | 0 | 0 | 0 | 0 | 0 | 0 | 0 | 0 | 0 | 0 | 0 | 0 | 0 |
| Carrots | 0 | 0 | 0 | 0 | 0 | 0 | 0 | 0 | 8 | 12 | 23 | 13 | 9 | 6 | 4 | 2 | 1 | 0 | 0 | 0 | 0 | 0 | 0 | 0 | 0 | 0 | 0 | 0 |
| cheese cream | 0 | 0 | 0 | 0 | 0 | 0 | 0 | 0 | 0 | 0 | 0 | 0 | 0 | 4 | 8 | 12 | 9 | 8 | 6 | 4 | 2 | 1 | 0 | 0 | 0 | 0 | 0 | |
| chicken | 0 | 0 | 10 | 14 | 49 | 33 | 35 | 13 | 7 | 2 | 3 | 0 | 0 | 0 | 0 | 0 | 0 | 0 | 0 | 0 | 0 | 0 | 0 | 0 | 0 | 0 | 0 | 0 |
| chips | 0 | 0 | 0 | 0 | 0 | 0 | 0 | 0 | 0 | 0 | 0 | 4 | 14 | 13 | 13 | 8 | 6 | 3 | 0 | 1 | 0 | 0 | 0 | 0 | 0 | 0 | 0 | |
| cornflakes | 0 | 0 | 0 | 0 | 0 | 0 | 0 | 0 | 7 | 18 | 17 | 15 | 13 | 5 | 3 | 1 | 0 | 0 | 0 | 0 | 0 | 0 | 0 | 0 | 0 | 0 | 0 | 0 |
| cottage cheese | 0 | 0 | 0 | 0 | 0 | 0 | 8 | 11 | 17 | 22 | 13 | 16 | 9 | 1 | 0 | 0 | 0 | 0 | 0 | 0 | 0 | 0 | 0 | 0 | 0 | 0 | 0 | |
| cucumber | 0 | 0 | 0 | 0 | 15 | 23 | 39 | 18 | 15 | 9 | 5 | 7 | 0 | 0 | 0 | 0 | 0 | 0 | 0 | 0 | 0 | 0 | 0 | 0 | 0 | 0 | 0 | 0 |

FIG. 1H

| customerid | itemid | itemname | purchase_gap_median_days | purchase_gap_stddev_days |
|---|---|---|---|---|
| 1234 | 1 | milk | 6 | 2 |
| 1234 | 2 | bread | 7 | 2 |
| 1234 | 3 | banana | 5 | 2 |
| 1234 | 4 | eggs | 14 | 2 |
| 1234 | 5 | strawberry | 7 | 2 |
| 1234 | 6 | grapes | 9 | 2 |
| 1234 | 7 | Oreos | 19 | 2 |
| 1234 | 8 | yogurt | 6 | 2 |
| 1234 | 9 | mushrooms | 5 | 2 |
| 1234 | 10 | tomatoes | 9 | 2 |
| 1234 | 11 | ketchup | 36 | 2 |
| 1234 | 12 | cheese cream | 18 | 2 |
| 1234 | 13 | sugar | 51 | 2 |
| 1234 | 14 | salt | 55 | 2 |
| 1234 | 15 | cottage cheese | 10 | 2 |
| 1234 | 16 | light butter | 23 | 2 |

FIG. 1I

| customerid | itemid | itemname | purchase_gap_median_days | purchase_gap_stddev_days | last_purchase_date | possible_purchase_start_date |
|---|---|---|---|---|---|---|
| 1234 | 1 | milk | 6 | 2 | 12/17/2016 | 12/21/2016 |
| 1234 | 2 | bread | 7 | 2 | 12/17/2016 | 12/22/2016 |
| 1234 | 3 | banana | 5 | 2 | 12/17/2016 | 12/20/2016 |
| 1234 | 4 | eggs | 14 | 2 | 12/10/2016 | 12/22/2016 |
| 1234 | 5 | strawberry | 7 | 2 | 12/17/2016 | 12/22/2016 |
| 1234 | 6 | grapes | 9 | 2 | 12/11/2016 | 12/18/2016 |
| 1234 | 7 | Oreos | 19 | 2 | 12/17/2016 | 1/3/2017 |
| 1234 | 8 | yogurt | 6 | 2 | 12/17/2016 | 12/21/2016 |
| 1234 | 9 | mushrooms | 5 | 2 | 12/17/2016 | 12/20/2016 |
| 1234 | 10 | tomatoes | 9 | 2 | 12/17/2016 | 12/24/2016 |
| 1234 | 11 | ketchup | 36 | 2 | 12/17/2016 | 1/20/2017 |
| 1234 | 12 | cheese cream | 18 | 2 | 12/10/2016 | 12/26/2016 |
| 1234 | 13 | sugar | 51 | 2 | 11/15/2016 | 1/4/2017 |
| 1234 | 14 | salt | 55 | 2 | 12/17/2016 | 2/8/2017 |
| 1234 | 15 | cottage cheese | 10 | 2 | 12/11/2016 | 12/19/2016 |
| 1234 | 16 | light butter | 23 | 2 | 12/4/2016 | 12/25/2016 |

FIG. 1J

| customerid | itemid | itemname | purchase_gap_median_days | purchase_gap_stddev_days | last_purchase_date | possible_purchase_startdate |
|---|---|---|---|---|---|---|
| 1234 | 1 | milk | 6 | 2 | 12/17/2016 | 12/21/2016 |
| 1234 | 1 | milk | 6 | 2 | 12/17/2016 | 12/22/2016 |
| 1234 | 1 | milk | 6 | 2 | 12/17/2016 | 12/23/2016 |
| 1234 | 1 | milk | 6 | 2 | 12/17/2016 | 12/24/2016 |
| 1234 | 1 | milk | 6 | 2 | 12/17/2016 | 12/25/2016 |
| 1234 | 15 | cottage cheese | 10 | 2 | 12/11/2016 | 12/19/2016 |
| 1234 | 15 | cottage cheese | 10 | 2 | 12/11/2016 | 12/20/2016 |
| 1234 | 15 | cottage cheese | 10 | 2 | 12/11/2016 | 12/21/2016 |
| 1234 | 15 | cottage cheese | 10 | 2 | 12/11/2016 | 12/22/2016 |
| 1234 | 15 | cottage cheese | 10 | 2 | 12/11/2016 | 12/23/2016 |
| 1234 | 16 | light butter | 23 | 2 | 12/4/2016 | 12/25/2016 |
| 1234 | 16 | light butter | 23 | 2 | 12/4/2016 | 12/26/2016 |
| 1234 | 16 | light butter | 23 | 2 | 12/4/2016 | 12/27/2016 |
| 1234 | 16 | light butter | 23 | 2 | 12/4/2016 | 12/28/2016 |
| 1234 | 16 | light butter | 23 | 2 | 12/4/2016 | 12/29/2016 |

FIG. 1K

| Date | itemname |
|---|---|
| 12/25/2016 | milk |
| 12/25/2016 | light butter |
| 12/25/2016 | eggs |
| 12/25/2016 | strawberry |
| 12/25/2016 | ... |
| 12/25/2016 | ... |
| 12/25/2016 | ... |
| 12/25/2016 | ... |
| 12/25/2016 | ... |

FIG. 1L

| avocado | Bakingpowder | banana | BBQsauce | Beef | Beer | bread | Carrots | CashewNuts | cheesecream | chicken | chips | coffee | cornflakes | cottagecheese | cucumber |
|---|---|---|---|---|---|---|---|---|---|---|---|---|---|---|---|
| 1 | 0 | 1 | 0 | 0 | 0 | 1 | 0 | 0 | 0 | 1 | 0 | 0 | 0 | 0 | 1 |
| 0 | 0 | 1 | 0 | 0 | 0 | 0 | 1 | 0 | 0 | 1 | 0 | 0 | 1 | 1 | 1 |
| 1 | 0 | 1 | 0 | 0 | 0 | 1 | 0 | 0 | 0 | 0 | 1 | 0 | 0 | 0 | 0 |
| 0 | 0 | 0 | 0 | 0 | 0 | 0 | 0 | 0 | 1 | 1 | 0 | 0 | 0 | 0 | 1 |
| 1 | 0 | 1 | 0 | 0 | 0 | 0 | 0 | 0 | 0 | 0 | 0 | 0 | 0 | 1 | 0 |
| 0 | 0 | 1 | 0 | 1 | 0 | 1 | 0 | 0 | 0 | 1 | 0 | 0 | 1 | 0 | 1 |
| 1 | 0 | 1 | 0 | 0 | 0 | 1 | 1 | 1 | 0 | 1 | 1 | 1 | 0 | 1 | 1 |
| 1 | 0 | 1 | 0 | 0 | 0 | 0 | 0 | 0 | 1 | 1 | 0 | 0 | 1 | 0 | 0 |
| 0 | 0 | 1 | 0 | 0 | 0 | 1 | 0 | 0 | 0 | 0 | 0 | 0 | 0 | 0 | 1 |
| 1 | 0 | 1 | 0 | 0 | 0 | 0 | 1 | 0 | 0 | 1 | 0 | 0 | 0 | 1 | 1 |
| 1 | 0 | 1 | 0 | 1 | 0 | 1 | 0 | 0 | 0 | 1 | 1 | 0 | 1 | 0 | 0 |
| 0 | 0 | 1 | 0 | 0 | 0 | 0 | 1 | 0 | 1 | 1 | 0 | 0 | 0 | 1 | 1 |
| 1 | 0 | 0 | 0 | 0 | 0 | 1 | 0 | 0 | 0 | 0 | 0 | 0 | 0 | 0 | 0 |
| 0 | 0 | 1 | 0 | 0 | 1 | 0 | 0 | 0 | 0 | 1 | 0 | 1 | 1 | 0 | 0 |
| 1 | 0 | 0 | 0 | 0 | 0 | 1 | 0 | 1 | 0 | 0 | 0 | 0 | 0 | 0 | 1 |
| 1 | 0 | 1 | 0 | 0 | 0 | 0 | 1 | 0 | 0 | 1 | 1 | 0 | 0 | 1 | 0 |

FIG. 1M

| rules | support | confidence | lift |
|---|---|---|---|
| {banana=1,chicken=1,mushrooms=1,yogurt=1} => {Lime=1} | 0.521739 | 0.970588 | 1.436017 |
| {Bakingpowder=0,banana=1,chicken=1,mushrooms=1,yogurt=1} => {Lime=1} | 0.505929 | 0.969697 | 1.434698 |
| {banana=1,chicken=1,Flour=0,mushrooms=1,yogurt=1} => {Lime=1} | 0.505929 | 0.969697 | 1.434698 |
| {Bakingpowder=0,banana=1,chicken=1,Flour=0,mushrooms=1,yogurt=1} => {Lime=1} | 0.505929 | 0.969697 | 1.434698 |
| {banana=1,chicken=1,mushrooms=1,pancakesyrup=0,yogurt=1} => {Lime=1} | 0.501976 | 0.969466 | 1.434356 |
| {banana=1,chicken=1,mayonnaise=0,mushrooms=1,yogurt=1} => {Lime=1} | 0.501976 | 0.969466 | 1.434356 |
| {chicken=1,mushrooms=1,yogurt=1} => {Lime=1} | 0.525692 | 0.963768 | 1.425926 |
| {Bakingpowder=0,chicken=1,mushrooms=1,yogurt=1} => {Lime=1} | 0.509881 | 0.962687 | 1.424326 |
| {chicken=1,Flour=0,mushrooms=1,yogurt=1} => {Lime=1} | 0.509881 | 0.962687 | 1.424326 |
| {Bakingpowder=0,chicken=1,Flour=0,mushrooms=1,yogurt=1} => {Lime=1} | 0.509881 | 0.962687 | 1.424326 |
| {chicken=1,mushrooms=1,pancakesyrup=0,yogurt=1} => {Lime=1} | 0.505929 | 0.962406 | 1.423911 |
| {chicken=1,mayonnaise=0,mushrooms=1,yogurt=1} => {Lime=1} | 0.505929 | 0.962406 | 1.423911 |
| {chicken=1,mushrooms=1,oliveoil=0,yogurt=1} => {Lime=1} | 0.501976 | 0.962121 | 1.423489 |
| {BBQsauce=0,chicken=1,mushrooms=1,yogurt=1} => {Lime=1} | 0.501976 | 0.962121 | 1.423489 |
| {chicken=1,Honey=0,mushrooms=1,yogurt=1} => {Lime=1} | 0.501976 | 0.962121 | 1.423489 |
| {banana=1,chicken=1,yogurt=1} => {Lime=1} | 0.525692 | 0.943262 | 1.395587 |
| {banana=1,chicken=1,Flour=0,yogurt=1} => {Lime=1} | 0.509881 | 0.941606 | 1.393136 |
| {banana=1,chicken=1,pancakesyrup=0,yogurt=1} => {Lime=1} | 0.505929 | 0.941176 | 1.392501 |

FIG. 1N

| Precedent | Antecedent | support | confidence | lift |
|---|---|---|---|---|
| Lime | mushrooms | 0.632411 | 0.935673 | 1.259176 |
| banana,Lime | mushrooms | 0.620553 | 0.951515 | 1.280496 |
| chicken | mushrooms | 0.616601 | 0.934132 | 1.257103 |
| yogurt | mushrooms | 0.604743 | 0.910714 | 1.225589 |
| banana,chicken | mushrooms | 0.604743 | 0.950311 | 1.278875 |
| banana,yogurt | mushrooms | 0.592885 | 0.9375 | 1.261636 |
| chicken,Lime | mushrooms | 0.565217 | 0.979452 | 1.318092 |
| banana,chicken,Lime | mushrooms | 0.557312 | 0.986014 | 1.326923 |
| avocado | mushrooms | 0.55336 | 0.915033 | 1.2314 |
| Lime,yogurt | mushrooms | 0.55336 | 0.965517 | 1.29934 |
| mushrooms,yogurt | Lime | 0.55336 | 0.915033 | 1.35382 |
| banana,Lime,yogurt | mushrooms | 0.549407 | 0.985816 | 1.326656 |
| chicken,yogurt | mushrooms | 0.545455 | 0.958333 | 1.289672 |
| avocado,banana | mushrooms | 0.541502 | 0.971631 | 1.307568 |
| banana,chicken,yogurt | mushrooms | 0.537549 | 0.964539 | 1.298023 |
| Lime,yogurt | chicken | 0.533597 | 0.931034 | 1.410489 |
| banana,milk | mushrooms | 0.529644 | 0.930556 | 1.25229 |
| strawberry | mushrooms | 0.525692 | 0.910959 | 1.225918 |
| chicken,Lime,yogurt | mushrooms | 0.525692 | 0.985185 | 1.325808 |
| banana,chicken,Lime | yogurt | 0.525692 | 0.93007 | 1.400641 |
| banana,strawberry | mushrooms | 0.521739 | 0.956522 | 1.287234 |
| banana,chicken,Lime,yogurt | mushrooms | 0.521739 | 0.992481 | 1.335626 |
| banana,redpotato | mushrooms | 0.513834 | 0.928571 | 1.24962 |
| avocado,Lime | mushrooms | 0.509881 | 0.984733 | 1.325199 |
| avocado,yogurt | mushrooms | 0.505929 | 0.962406 | 1.295153 |
| avocado,banana,Lime | mushrooms | 0.505929 | 1 | 1.345745 |

FIG. 10

NETWORK-BASED INVENTORY REPLENISHMENT

RELATED APPLICATIONS

This application claims priority to U.S. Provisional Application Ser. No. 62/446,566 entitled: "Network-Based Inventory Replenishment," filed on Jan. 16, 2017; and U.S. Provisional Application Ser. No. 62/446,577 entitled "CTO Demo Video," filed on Jan. 16, 2017; the disclosures of which are incorporated by reference herein in their entireties.

BACKGROUND

Consumers may use home scanners, such as mobile phones equipped with cameras, to scan spent items that they wish to purchase in order to replenish their pantries. Furthermore, conventional approaches have to necessarily rely on what the consumer has in their pantries or what the consumer specifically makes a request to be placed in their shopping lists. Consumers may take computer-generated shopping lists to the grocery. However, such systems require manual effort to scan items and what they produce is limited to a shopping list.

It would be desirable to provide a network-based inventory replenishment method that automatically assess inventory requirements and suggests or completes orders for the items over a network, such as the Internet.

SUMMARY

In various embodiments, methods and a system for network-based inventory replenishment are presented.

According to an embodiment, a method for network-based inventory replenishment is provided. Specifically, a history of items for a consumer are analyzed. Based on the analyzed history, a specific item is predicted to be in need of replenishment by the consumer. Finally, the consumer is notified of the specific item.

DETAILED DESCRIPTION

Figure 1A:
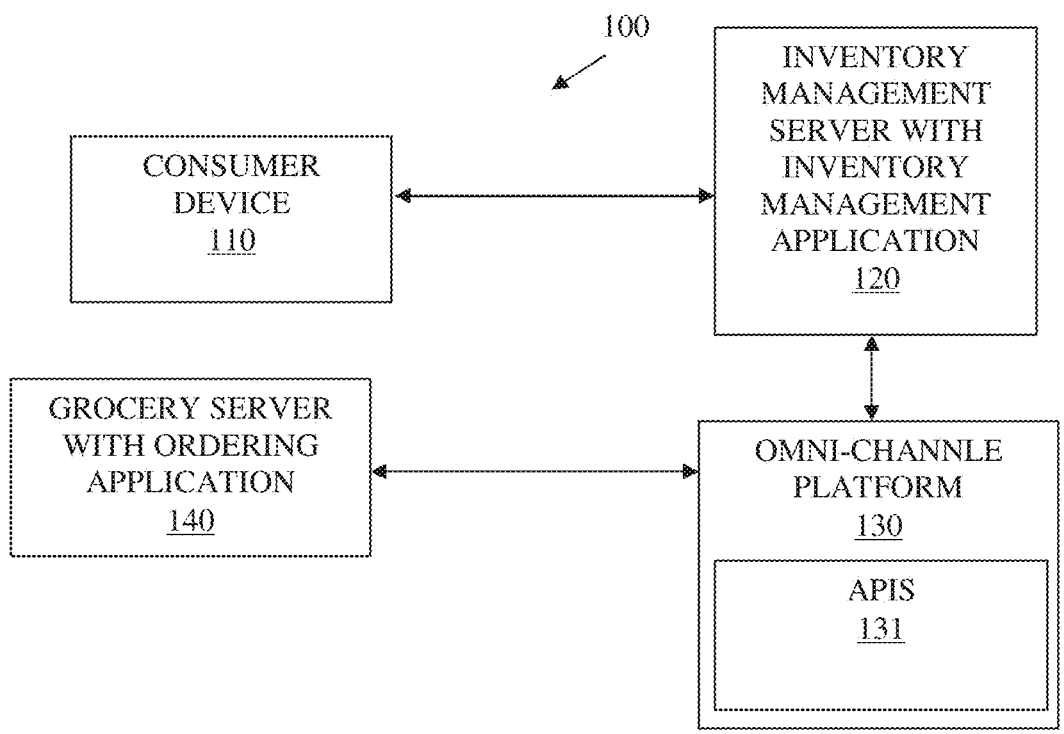
FIG. 1A is a diagram of a system for network-based inventory replenishment, according to an example embodiment.

FIG. 1A is a diagram of a system for network-based inventory replenishment, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the network-based inventory replenishment techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for network-based inventory replenishment can be implemented in all, or some combination of the components shown in different hardware computing devices having one or more hardware processors.

The system 100 includes: a consumer-operated device 110, an inventory management server with an inventory management application 120 (hereinafter referred to as an "inventory management application 120"), an Omni-Channel Platform 130 with Application Programming Interfaces (APIs) 131, and a grocery server with an ordering application 140 (hereinafter referred to as an "ordering application 140").

As used herein, the terms "consumer," "customer," and "user" may be used interchangeably and synonymously.

The consumer device 110 can include any processor-enabled device, such as but not limited to: a desktop computer, Virtual Reality (VR) enabled devices, a laptop computer, a wearable processing device, a tablet computer, a mobile phone, an in-vehicle processing device capable of network-based communication, a standalone appliance, or any device with network-capabilities that is part of the Internet-of-Things (IoTs).

The Omni-Channel Platform (OCP) includes a variety of integrated communication channels, such as and by way of example only: phone-based communications, voice-based communications, VR-based (augmented reality with animation and audio) communications, messaging-based communications, text-based communications, video-based gesture communications, web (Internet) based communications, kiosk-based communications, Point-Of-Sale (POS) terminal based communications, and the like.

In an example configuration, inventory management application 120 connects through a channel-specific API 131 to the Omni-Channel based on a channel (voice, video-gesture based, text, messaging) initiated through a messaging application processing on the consumer device 110. In an embodiment, the Omni-Channel platform may be a cloud-based system connected to a global communications network, also known as the Internet. Inventory management server may include a variety of systems comprising, computers with processors, memory, programs (such as inventory management application 120), and data storage.

The grocery server includes any grocery-based ordering system that is capable of providing grocery ordering through a network-based interface (server or cloud based). The grocery server may include a variety of backend systems and network-facing systems that processing on computers with processors, memory, programs (such as ordering application 141), and data storage. The APIs 131 connect to the ordering application 141. The specific-API 131 processed by the Omni-Channel server 130 is selected based on a network-facing API of the ordering application.

As used herein, the phrase "inventory management" may be used synonymously and interchangeably with the phrase "inventory replenishment."

Inventory management application 120 keeps track of inventory items, how often they are used up, and predicts when new items must be ordered to replenish used-up items based on a consumer module. That is the prediction is done by the inventory management application 120 without any consumer input and based on transaction records for the consumer. This is a consumer-centric approach that predicts when new items should be ordered on behalf of a consumer without (automated visual) inspection of any current physical inventory of the items for the consumer and without any manually-directed commands for ordering the new items.

The inventory management application 120 predicts the replenishment of new items based on analysis of previous transactions conducted by the consumer through identification of patterns in the previous transactions for the items. The previous transactions can be captured through consumer transaction logs with retailers. Such logs can be retailer specific and/or credit/debit company specific, such that a unique consumer identifier for the consumer through a retailer transaction history (such as loyalty account number, loyalty identifier. etc.) or a credit/debit transaction history (such as account number) can be processed to identify the transactions of the consumer.

The transaction logs or histories can be dynamically culled from the retailers and/or credit/debit companies with the unique consumer identifiers. Each transaction includes a transaction record that includes a variety of information, such as item identifiers for the items purchased, cost per item, date and time of purchase, retailer identifier for the retailer associated with the transaction log, and price per-item and overall transaction price.

Alternatively, the transaction logs or histories may be maintained on a per-consumer bases as transactions are consummated, such that there is no need to dynamically cull retailers and/or credit/debit companies with the unique consumer identifier for obtaining a consumer-specific transaction log or history because such log or history is maintained for the consumer as the consumer makes transactions in real-time.

The inventory management/replenishment application 120 can receive the transaction histories through APIs with the retailer-based systems, either through pushes from the retailer-based systems or pull requests from the inventory replenishment application 120 made to the retailer-based systems for the transaction histories or access to a retailers transaction histories for all consumers (in which case the inventory replenishment application 120 dynamically culls and aggregates the consumer-specific transaction history).

The frequency with which the inventory replenishment application 120 receives, acquires, or dynamically aggregates the consumer transactions can be configured (such as once per day, twice per week, once a week, etc.). Although as noted above, the inventory replenishment application 120 may be maintaining or have access to a real-time transaction history of the consumer.

The transaction records from the transaction histories that is unique to a particular consumer are analyzed to predict when new items are needed in an inventory for the consumer. This prediction is based on the patterns detected in the transaction histories which reveal consumption patterns for the consumer on a per-item basis. The patterns also reveal a time-based consumption of the consumer on a per-item basis. Each pattern, at least, includes an item identifier for an item (or groupings of item identifiers for groupings of items) along with dates of purchase for the items or groups of items.

The inventory replenishment application 120 also serves as a front-end interface for consumer orders placed with the grocery ordering application 140 through network-based communications. In this situation, the transaction history (for these transactions) is directly accessible to the inventory replenishment application 120. It is noted that other transactions of the consumer may also be obtained and/or maintained in a database by the inventory replenishment application 120 as discussed above. The Omni-Channel platform 130 provides a channel translation through the APIs 131 for consumer ordering with the grocery ordering application 140. That is, the consumer can use a voice-based channel to engage the inventory replenishment application 120 to place an order with a grocery. The voice-based channel (first channel of communication as initiated by the consumer) is provided to the Omni-Channel platform where the audio electronic data (representing the voice dialogue between the consumer and the order replenishment application 120) is translated into web-based commands through a first API 131 and into an second API 131 that provides automated network-based ordering through the grocery ordering application 120; they web-based commands representing a second channel of communication that is disparate and different from the original voice-based channel).

The Omni-Channel platform 130 and the APIs 131 also provide for an interactive voice dialogue during the ordering processing between the inventory replenishment application 120 and the consumer through the consumer device 110 using a same channel of communication (voice).

In an embodiment, the patterns are identified by processing a recurrent neural network (RNN) algorithm and machine learning recurrent modules to identify the gaps between the purchases that the consumer has made and to identify the non-linear sequence of these gaps. Testing has revealed that this method is more accurate than clustering.

Following receipt of instructions to order suggested items, the inventor replenishment application 120 submits an order to ordering application at grocery server 140 through platform 10 to purchase the items. In an embodiment, Inventory management server and the inventory management application 120 may be cloud-based and also connected to the Internet.

In an embodiment, the consumer device 110 is Amazon Echo® or Google Home® providing for voice interaction between the consumer and interaction with the inventory replenishment application 120.

A few example interactions and processing scenarios, with respect to system 100, are now discussed for comprehension of various teachings presented herein. In these example illustrations, the consumer device 110 is an Amazon Echo® enabled device.

Like so many people in the 21st century, a consumer, Kate, is trying to get the most out of every minute of her day, and that involves plenty of multi-tasking. As we meet Kate in her kitchen first thing in the morning, she's already busy maximizing her time. While Kate makes breakfast, she's also making a shopping list. Kate has some help with these tasks . . . and she doesn't need to lift a finger (through the beneficial integrated processing of the order replenishment application 120, the Omni-Channel platform 130, and the APIs 131).

Kate uses a networked voice enable device 110 to open the inventory replenishment application 120 through a network connection: Kate: "Alexa®, open my pantry application." The networked voice and speaker enabled device 110 records the instruction and opens (contacts over a network connection) her dialogue/interaction with the inventory replenishment application 120.

Without any further interaction or manual effort, the inventory replenishment application 120 is working hard (processing) so Kate doesn't have to. The inventory replenishment application 120 has picked up (processed Kate's transaction records) on how frequently Kate purchases some of the staples (items) on her shopping list. Using predictive analytics, the inventory replenishment application 120 can tell Kate that she's running low on the essentials (selective items). The inventory replenishment application 120 can suggest purchases, and by using the Omni-Channel platform 130 and the APIs 131, the inventory replenishment application 120 can extend the search for the items to be purchased well beyond a single item. The networked voice and speaker enabled device relays the suggestions communicated from the inventory replenishment application 120 to Kale through a voice dialogue.

The inventory replenishment application 120 even lets Kate know how she can save money on other items at her favorite grocery store through interaction between the inventory replenishment application 120 and promotion data accessible through interfaces between the grocery store's systems/interfaces and the inventory replenishment application 120 (and/or through the APIs 131 interfaced to the inventory replenishment application 120).

Alexa® (as communicated through the order replenishment application 120 to consumer device 110): "Based on your recent transactions, it looks like you're almost out of milk and eggs. Also, yogurt is on sale for one dollar . . . The order replenishment application 120 then has the consumer device 110 response with voice to Kate with a question, "would you like me to order this at the supermarket for a total of $7?" Kate is using voice-activated technology (one type of communication channel) to build interactively and over time her shopping list. Kate responds "Yes." This is an indication to the order replenishment application 120 that Kate is confirming she is almost out of these items.

The order replenishment application 120 relays the order (which was suggested by the order replenishment application 120) through the Omni-Channel platform 130 and its APIs for ordering with the ordering application 140 Kate's items and paying for the transaction, through a payment information that Kate has previously registered in a profile with the order replenishment application 120 or that Kate has previous used for ordering through the order replenishment application 120.

The ordering application 140 may relay through the APIs 131 when Kate can pick up her order and where (what specific store location). The APIs 131 relay this to the inventory replenishment application 120, which provides the voice information to Kate through consumer device 110.

At the supermarket, while most customers are filling their carts and waiting in line to check out, Kate cruises directly to a special pick-up counter. Her groceries are already bagged and paid for, so she's in-and-out of the store in no time, giving her more time to do the things she enjoys. Thanks to the network-based inventory replenishment application 120, the Omni-Channel platform 130, and the APIs 131, Kate's busy day is made a whole lot easier.

In a second example scenario, the Omni-Channel platform 130 and its APIs 131 can interact with Kate through multiple disparate channels and devices 110 that Kate possesses. The Omni-Channel platform 130 and the APIs 131 can also interact with a physical sales person through the APIs. The scenario takes place with the Kate initially watching television and the sales person being physically located at his/her home. The VR setting when it takes place in the below scenario appears to take place in a sales room although a VR augment sales room based on an actual physical sales room.

The Savannah Sharks have made the playoffs once again, and Kate is one of their many fans getting ready to watch the team take the field today. Kate's friends and family know she's a Sharks fan, and with Omni-Channel personalization provided by the Omni-Channel platform 130, her bank does too. She gets a message on her phone: 100 dollars off a new TV for the big game when you open a new credit card!" Kate has been wanting to buy a new TV for a while. She decides the big game and the big savings make this the perfect time to get one, so she applies for the new credit card.

Thanks to the cross-channel integration of the Omni-Channel platform 130, Kate gets a notification on her phone. It invites her to use the coupon she just got from the credit card application to purchase her new TV immediately using VR technology. She goes to the e-commerce site on her computer (though consumer device 110) and indulges in a little extra retail therapy—perusing the site to see if there's anything else that catches her eye. She decides it's just the TV she wants, but this is an important purchase—not one to be made without doing some extra homework. And, while she doesn't have time to go to the store in person, she can get the real-time shopping experience she desires virtually. So. Kate puts on her VR headset (consumer device 110) and connects to a VR salesroom, where an electronics salesperson—who is also using VR technology—is ready to answer her questions.

For Kate, it's just like being in a real-life electronics store showroom, but she never leaves her living room. She's able to ask the sales assistant questions about the TVs that interest her and learn all about their features. With the sales assistant's guidance, she chooses her new TV and places her order. But, the game is in a few hours. There's no way she could ever receive her new TV in time to watch today's game on it, right? With the inventory replenishment application 120, Kate and the salesperson locate a service that can deliver the new TV in plenty of time for kickoff!

She's hoping the Sharks win their game, but even if they don't, Kate will have a victory. She was able to pick out her new TV without ever having to leave the comfort of her living room, and even have that new TV delivered in time to catch kickoff. The inventory replenishment application 120 integrated with the APIs 131 processed the VR channel request to locate a vendor application (such as ordering application 140) for the TV's payment and delivery in time for the big game. Its a big win for Kate, saving time and money, and making game day even more enjoyable.

In a third scenario, Kate is using a consumer device that is a phone (consumer device 110) and interacts with an automated bot over a messaging channel using a messaging application on the phone that the bot can be automatically engaged with Kate over a messaging platform.

Kate and her friend Michelle are watching their favorite team, the Savannah Sharks, on Kate's new TV. The Sharks score and Kate gets a notification on her phone: her local pizzeria is celebrating the Sharks' touchdown by offering a buy one, get one free deal on all pizzas.

Kate receives a test message on her phone from the automated bot that was triggered by the promotion through interactions between the pizzeria's promotions. Kate being a registered customer of the pizzeria, the bot sends a text message (text channel communication) that says: "the Sharks scored and that means you just scored 50% off from your local Pizza Shop!"

Kate and Michelle had been deciding what to do for dinner, so after hearing about this pizza special, Kate places the order on her phone through a text message or through selections provided for clicking by the bot, the bat displays the pizza choices and Kate selects (clicks) order. The bot responds with "your order comes to $7.82, is that okay?" Kate clicks yes.

Kate's interacting with a chat bot that is enabled over a messaging channel (text messaging). The chat bot can be a configuration of the inventory replenishment application 120 or an independent chat bat that interacts with the inventory replenishment application 120. This provides a seamless consumer experience—making it feel like she's communicating with a real person from the local pizza shop in real time even though some form of potentially artificial intelligence integrated with inventory replenishment application 120, the Omni-Channel platform 130, and the APIs 131 are actually being processed. When Kate places her order, the chat bot (bot) tells her to expect her pizza to arrive in about 30 minutes. The bot sends a message that states: "awesome, we'll see you at your door 30 minutes! (with a smile emoji).

The local pizza restaurant is integrated through APIs with the inventory replenishment application 120, which features third-party event integration. The pizzeria's systems are integrated into the Omni-Channel platform 130 for notifying its customers, like Kate, in real-time about restaurant specials timed specifically to follow exciting plays from their favorite teams.

As soon as the Sharks win their game in cold, snowy weather conditions, Kate gets another real-time notification from her pizza shop, who is also using weather notification service for purposes of attracting customers with special weather-specific promotions. The deal invites Kate to come and celebrate the Sharks° big win with 25 percent off all food and drinks (again through the bot and text messaging channel), free hot drinks with all orders and a free bucket of Buffalo wings to the first 50 people to respond to the offer.

The wings deal appeals to Kate, but she has to act quickly. She signs up using the restaurant's enabled messaging chat bot and gets a Quick-Response (OR) code in a text message confirming her order to show to the bartender. The restaurant's system is linked to the Omni-Channel platform 130 for restaurant point-of-sale (POS) integration that gives operators all the tools they need to boost sales and increase the pace of service. This integration is customized to the pizza restaurant's specific menu using an open API-helping to create a personalized experience for the customer and setting this pizza shop above their competition.

At this point, the bot messages Kate stating: "you just watched the Sharks win in the snow! (with an image of a football game in the snow)." The bot then messages Kate stating: "let's warm you and your friends up with a FREE bucket of wings from Pizza Pub!! To redeem you must be one of the first 50 people to respond to this offer."

Next, the bot provides a link in a message stating "do you want to redeem?" Kate then clicks "yes." The bot responds with a message: "congratulations! Here's your QR code for your FREE bucket of wings. (along with an image of OR Code) please show to the bartender."

In the end, the Sharks won and Kate and her friends got some excellent restaurant deals—putting everyone in good spirits. The inventory replenishment application 120, Omni-Channel platform 130, and the APIs provide the technology that has helped Kate and her friends save time and money, and savor the Sharks' victory even more by integrating into Kate's life and experiences using a messaging platform (channel of communication) that Kate is use to and responds well to.

These are but three example scenarios that utilize the inventory management application 120, the Omni-Channel platform 130, and the APIs 131 to provide real-time experiences to consumers on an individualized consumer bases.

It is to be noted that the inventory replenishment application 120 can in addition to predicting consumer inventory needs of items also engage the consumer in a proactively ordering items or services in an consumer unsolicited manner or a consumer solicited manner as discussed in scenario 2 above. Moreover, the inventory replenishment application 120 can be linked through the Omni-Channel platform 130 and its APIs to retailer systems for engaging the consumer in solicited offers from the retailer as discussed in scenario 3 above.

Moreover, the inventory replenishment application 120 combined with the Omni-Channel platform 130 with the APIs 131 can interact with the consumer over a variety of communication channels (voice, VR, video-gesture based, text, messaging applications, web, and the like). The system therefore provides a robust network-based inventory replenishment solution to the consumer that is customized to a specific consumer.

Figure 1B:
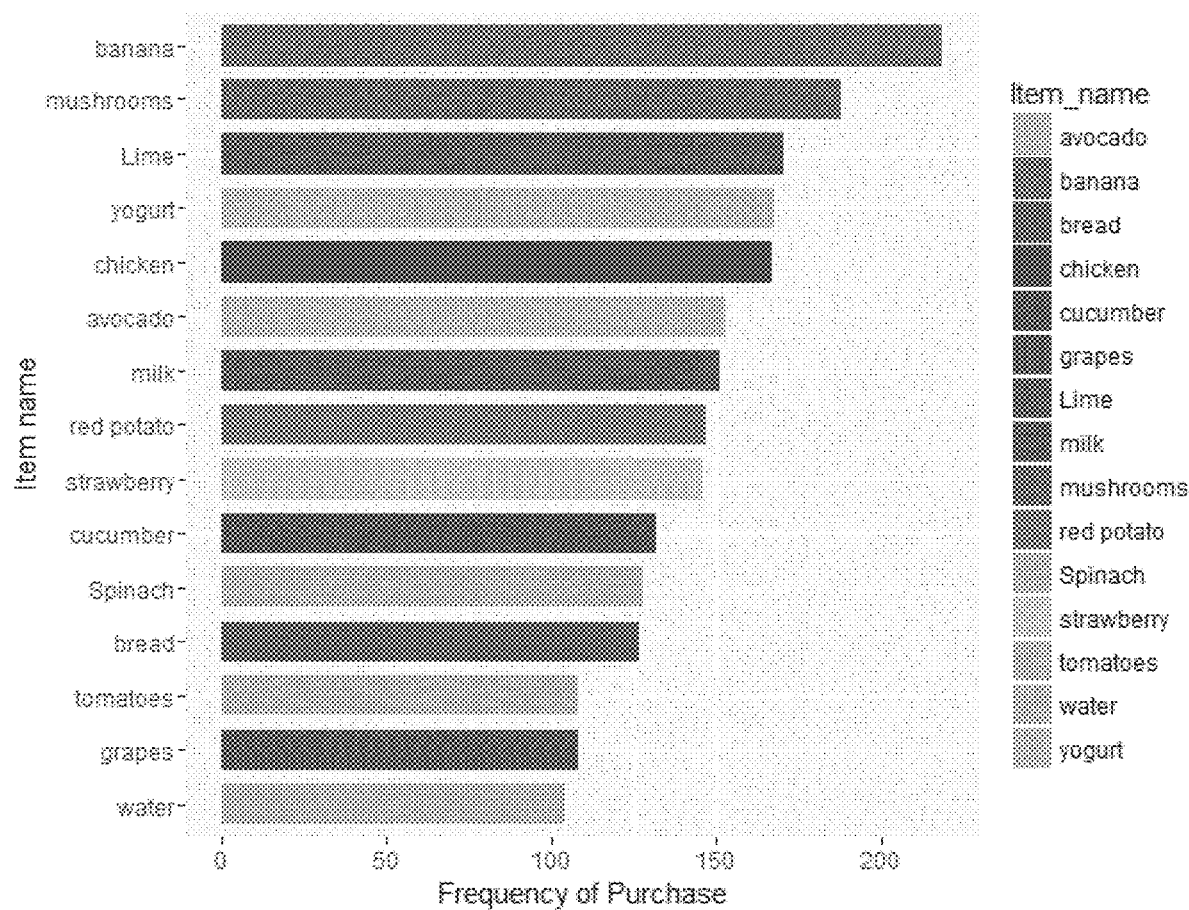
FIGS. 1B-1O diagrams depicting example situations for predicting replenishment, according to an example embodiment.

The FIGS. 1B-1O now discuss a variety of example prediction scenarios that can be processed on a per-consumer basis against consumer transactions for predicting consumer item replenishment in a proactive manner for the consumer. The processing associated with the prediction of inventory replenishment can be integrated into the inventory management application 120 or called as a third-party algorithm (such as an RNN algorithm) from the inventory management application 120 for proactive and consumer-specific inventory replenishment. The data is processed to explore and extrapolate the consumer's inventory needs and when those needs are predicted as being needed for specific consumer items to replenish the consumer's home inventory of items.

The transactions of the consumer are captured over a defined period of time, in the present examples over a period from March 2014 through December 2016. 253 transactions were selected from 4029 available transactions and 64 distinct items were noted by item identifier in the 253 selected transactions.

The FIG. 1B illustrates the sample consumer transactions in a graph where the X axis is the frequency of customer purchase and the Y axis is the unique item purchased (with only the top most frequently purchased items depicted). The least frequently purchased item is also noted (although not depicted). In this example, the least frequently purchased item as mayo, which was purchased just 5 times over the period (March 2014 to December 2016). The date of the first transaction is also noted as being, in the example, Mar. 29, 2014 and the date of the last transaction as being, in the example, Dec. 17, 2016.

Figure 1C:
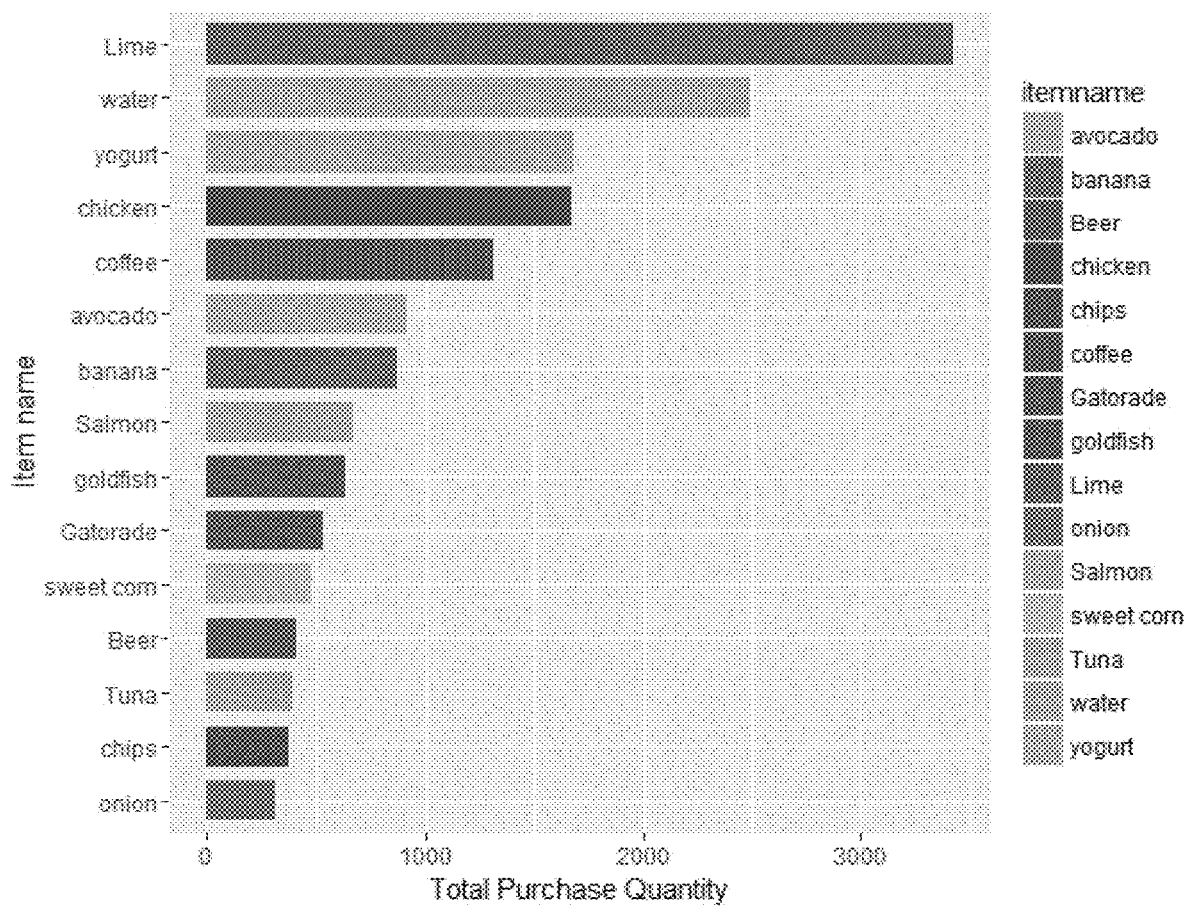

The FIG. 1C illustrates some exploratory data in graph form over the period where items purchased appear on the Y axis and the X axis represents a total purchase quantity for the item (only the items with the most purchase quantity for the period appear in the FIG. 1C). Here, other information is gathered with respect to maximum quantity of any given item during the period (limes), minimum purchased quantity over the period (again mayo not depicted). The average purchase frequency (median) is computed for the item quantities revealing 8 different medians having a standard deviation of 2 per month. The average purchase frequency (median) is also computed for the items revealing 2 medians with a 0.7 standard deviation per month.

Figure 1D:
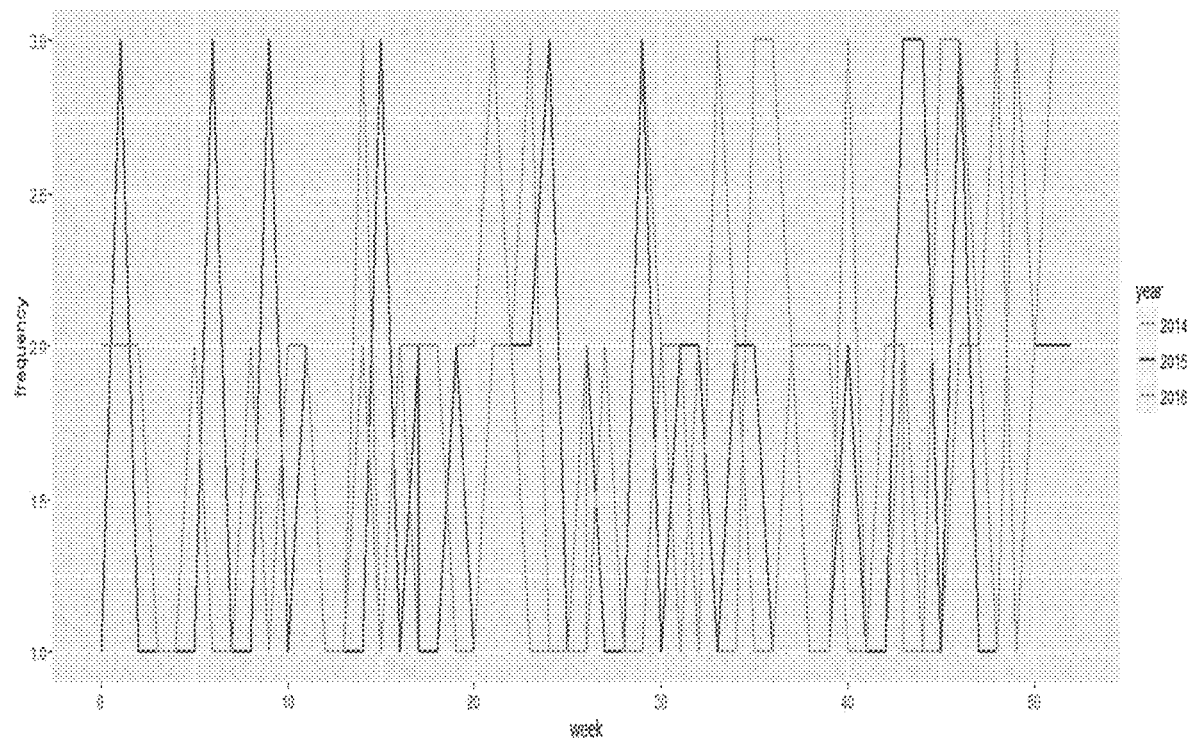

The FIG. 1D shows a graph for the item transaction data based on weekly purchase patterns for the example consumer over the period. The frequency of purchases is represented on the Y axis and the week for the period represented along the E axis, each year for the period (2014, 2015, and 2016) representing its own independent plot on the graph.

Figure 1E:
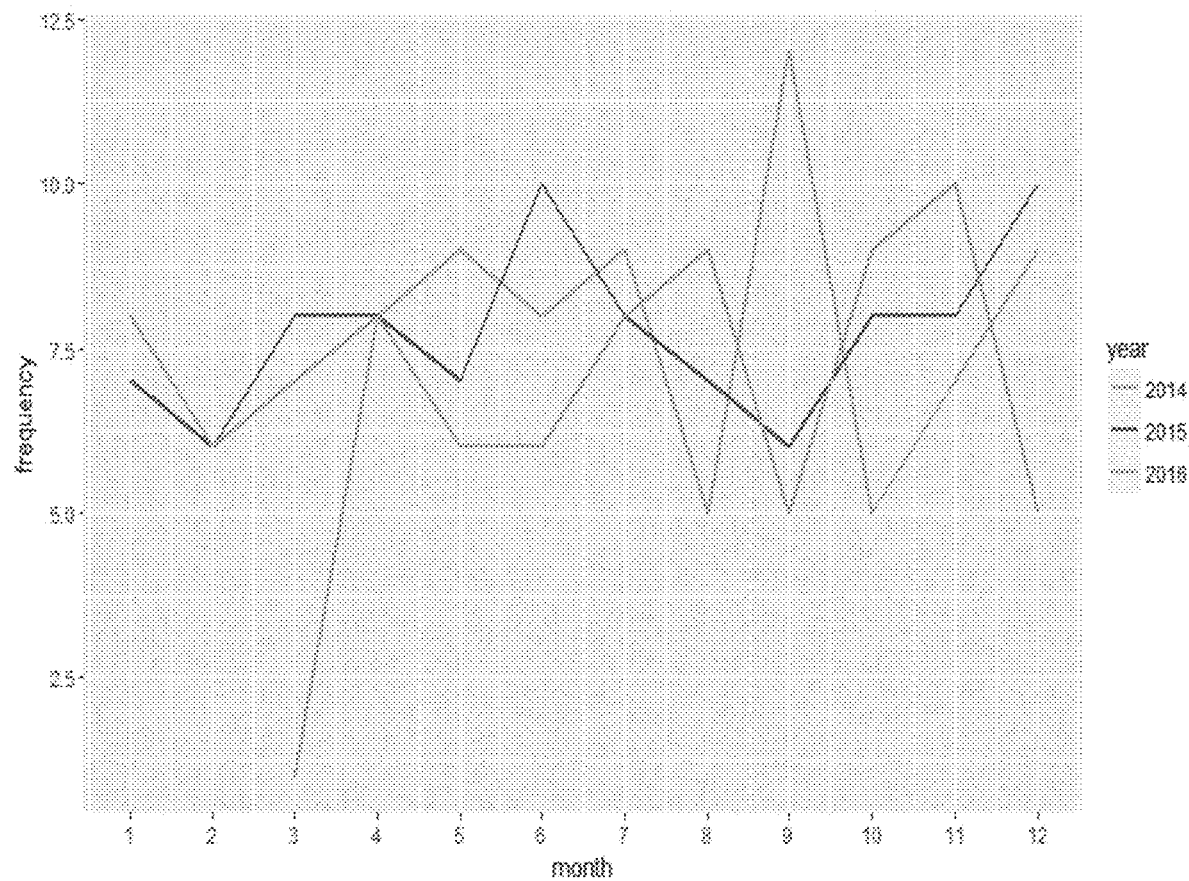

The FIG. 1E shows a graph for item transaction data based on monthly purchase patterns for the example consumer over the period. Here, the X axis represents the months, the Y axis the frequency of purchases and again each year having its own plot on the graph.

Figure 1F:
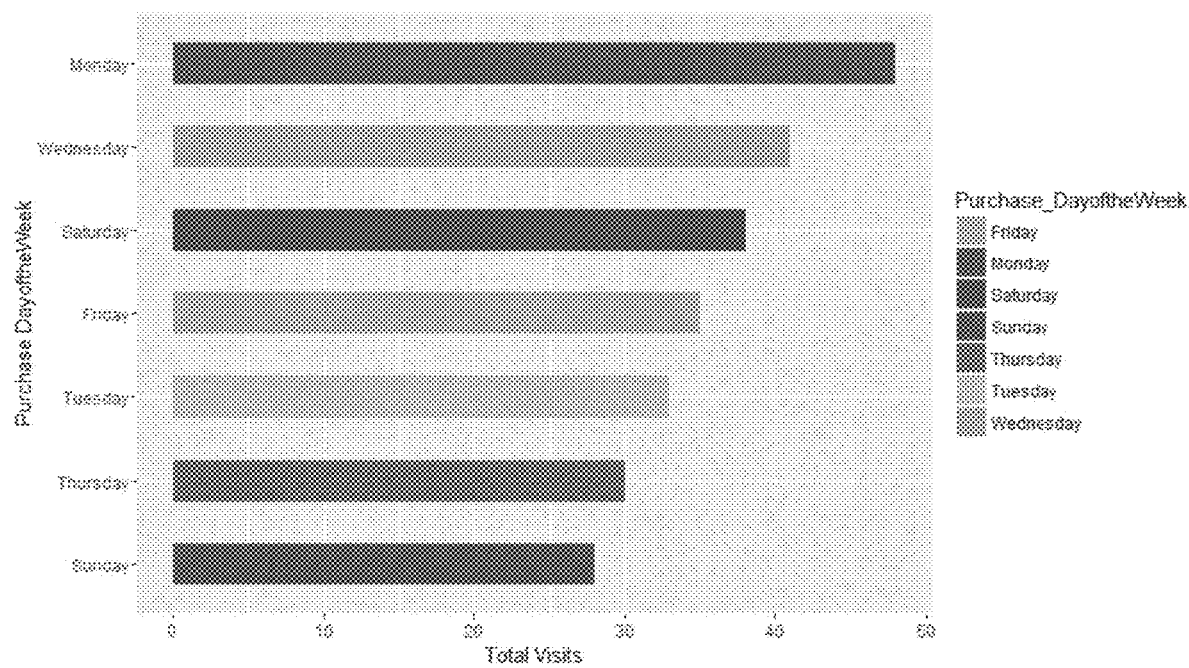

The FIG. 1F shows a graph for item transaction data based on day of the week. The days of the week are represented on the Y axis and total number of store visits for the item transactions represented on the X axis.

The FIG. 1G shows a table of item and quantity purchased, the items purchased are listed on the left as the rows, the columns represent the quantity of item being purchased during a single visit with the cells representing the number of times that a same quantity of the item was purchased during a visit.

The transaction item purchase data can also be clustered based on item name (categorical variable), day of week (categorical variable), and number of times that a unique item was purchased (numeric data).

During testing, clustering methods that utilize a Euclidian distance (distance between numeric data only) are not used; rather, a Gower distance for clustering is processed based on categorical variables.

For the sample period and example consumer's item purchase transaction history, 7 clusters were derived from the sample data. Each cluster represented a day of the week (M-F). This revealed that a same item can belong to multiple ones of the clusters (a same item purchased on different days of the week). Thus, clustering in this manner proves to be ineffective.

Next, during testing meaningful patterns were attempted to be derived from the sample consumer's days since last purchase. This was done by looping through the data looking for previous purchase dates of a same item and finding the time gap between purchases during the looping. This was attempted to be clustered, which revealed that some items are purchased at a very short interval while other items are purchased at large time intervals.

The FIG. 1H illustrates that a pattern is recognizable as a gap between purchases of an item (demonstrate a consumer consumption pattern on a per-item basis). The rows of the FIG. 1H identify the items and the columns represent the gap days between purchases. Nearly, if not all, of the items demonstrate a pattern for a time gap between purchases on a per item basis. For example, an avocado is bought every 4 to 12 days. Also, a banana was bought every 1 to 10 days. The cells of the table represent the number of times the gap days occurred in the sample data with a purchase of the item in question.

The FIG. 1I represents a table created with mean/median of gap purchases and the standard deviation for the same. This is processed for estimating the items that the consumer will likely buy in the further. The table includes columns for a unique customer identifier, unique item identifier, descriptive item name, the purchase gap median days, purchase gap standard deviation days.

The FIG. 1J shows a derived table for calculating per item the further purchase date of a specific item. The columns include: the unique customer identifier, the unique item identifier, the descriptive item name, the purchase gap median in days, the purchase gap standard deviation in days, the last purchase date for that item made by the consumer, and the calculated possible/likely predicted purchase state date for that item. The predicted purchase date of an item is calculated based on: the last purchase date+the median purchase (gap) in days—the standard deviation in purchase for that item in days.

The FIG. 1K shows a derived table for calculating the days on which an item is likely to be purchased by the consumer. This represents a future purchase items calculation. The columns and rows are as was presented in the FIG. 1J; however, each purchase of the item is listed, such that a single item appears more than once (which is unlike the FIG. 1J. The calculation for the days on which a particular item is likely to be purchased is: the item's last purchase date+ mean (purchase gap in days)—the standard deviation purchase date gap in days.

The FIG. 1L represents a results table for a specific date on which specific items will likely be purchased by the consumer. Using data from the FIG. 1K to predict what the consumer is likely to purchase on Dec. 25, 2016, the FIG. 1K can be queried for Dec. 25, 2016 and the results provided in the FIG. 1L. Here, the consumer is likely to purchase mile, light butter, eggs, and strawberries on Dec. 25, 2016. The generated results table includes a date and item name column and the rows represent the queried date from the table of the FIG. 1K.

The FIG. 1M represents the association rules for grocery purchases for the consumer in the derived table. Here, the columns of the table are the item names; the rows represents a transaction by the consumer; and the cells of the table are binary indications of either a 0 or a 1. The presence of a 1 indicates that the corresponding item in the item name column was purchased for that transaction; correspondingly, a presence of a 0 indicates that the corresponding item in the item name column was not purchased for that transaction. The total number of rows represents the total number of transactions by the consumer. The total number of columns is equal to the unique number of items purchased for at least one transaction in the total number of transactions.

The FIG. 1N represents the association using apriori algorithm. Because the total number of items is very likely to be large across the consumer's transaction data for the period selected. However, the support and confidence can be altered to 0.5 and 0.9, respectively, to reduce the number of rules processed by the algorithm. The bolded entries in the table of the FIG. 1N represent the rules when limes are in a given consumer transaction.

The FIG. 1O represents further processing of the algorithm in the FIG. 1N (in tabular format) for other items besides limes and to eliminate duplicates. 48 rules were generated as a result of filtering for the presence of specific items. After 16 redundant rules were removed, 32 rules remained.

The FIGS. 1B-1O illustrate how consumer transactions for a given period can be analyzed in a non-cluster fashion for predicting when specific items are in need of replenishment by a consumer and specific dates for which the specific items are likely to be purchased by the consumer. This permits the inventory replenishment application 120 to proactively engage or notify the consumer when specific items need replenished based on the consumer's consumption patterns derived in the manners discussed in the FIGS. 1B-1O.

Applicant notes that other techniques can be used as well, such that in an embodiment a RNN algorithm is processed for predicting replenishment. In an embodiment, the techniques presented in the FIGS. 1B-1O are processed for predicting replenishment. In an embodiment, a clustering approach is not processed for predicting replenishment. In an embodiment, a clustering approach can be used in combination with any of the above-mentioned techniques.

Figure 2:
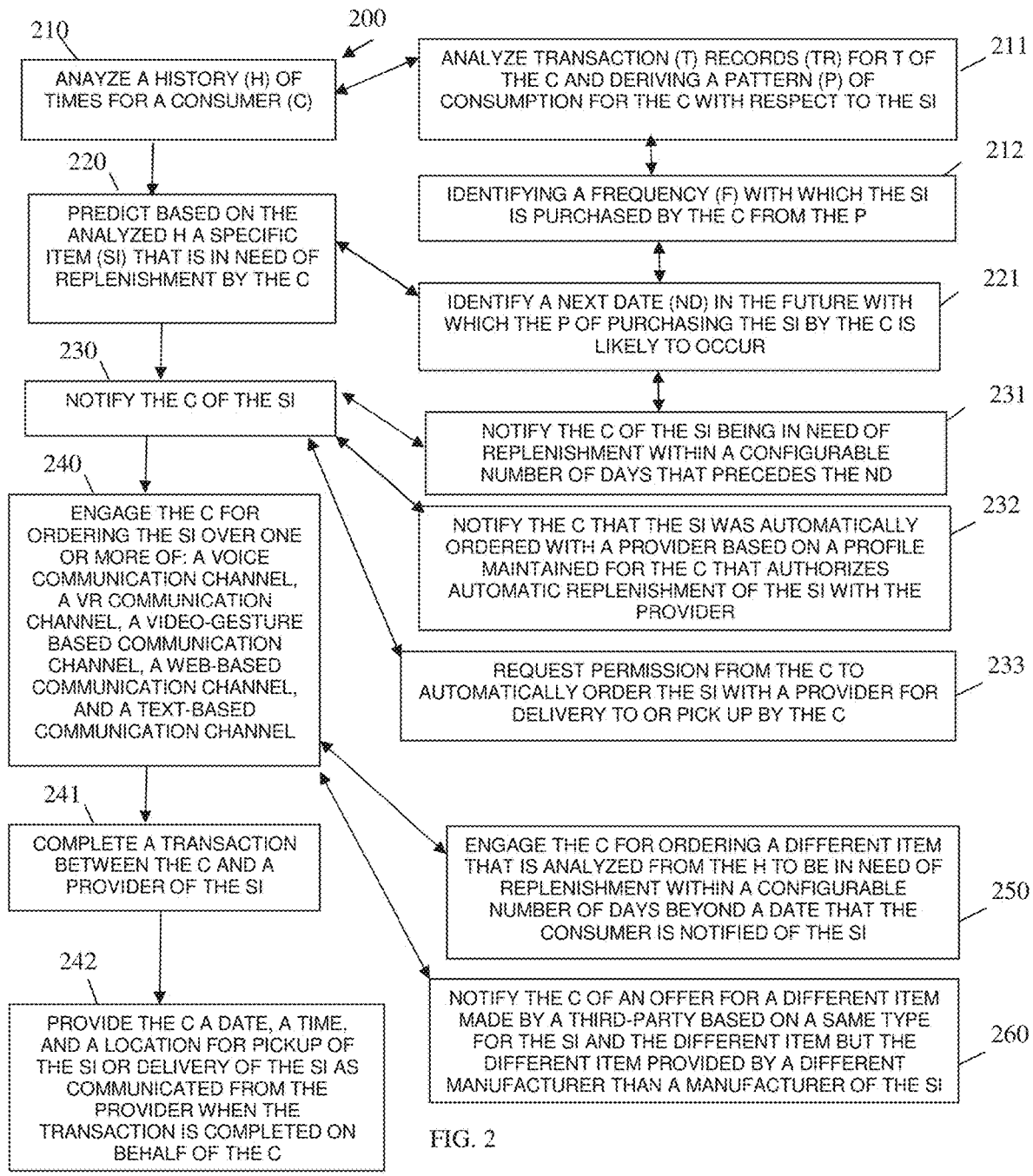
FIG. 2 is a diagram of a method for network-based inventory replenishment, according to an example embodiment.
Figure 3:
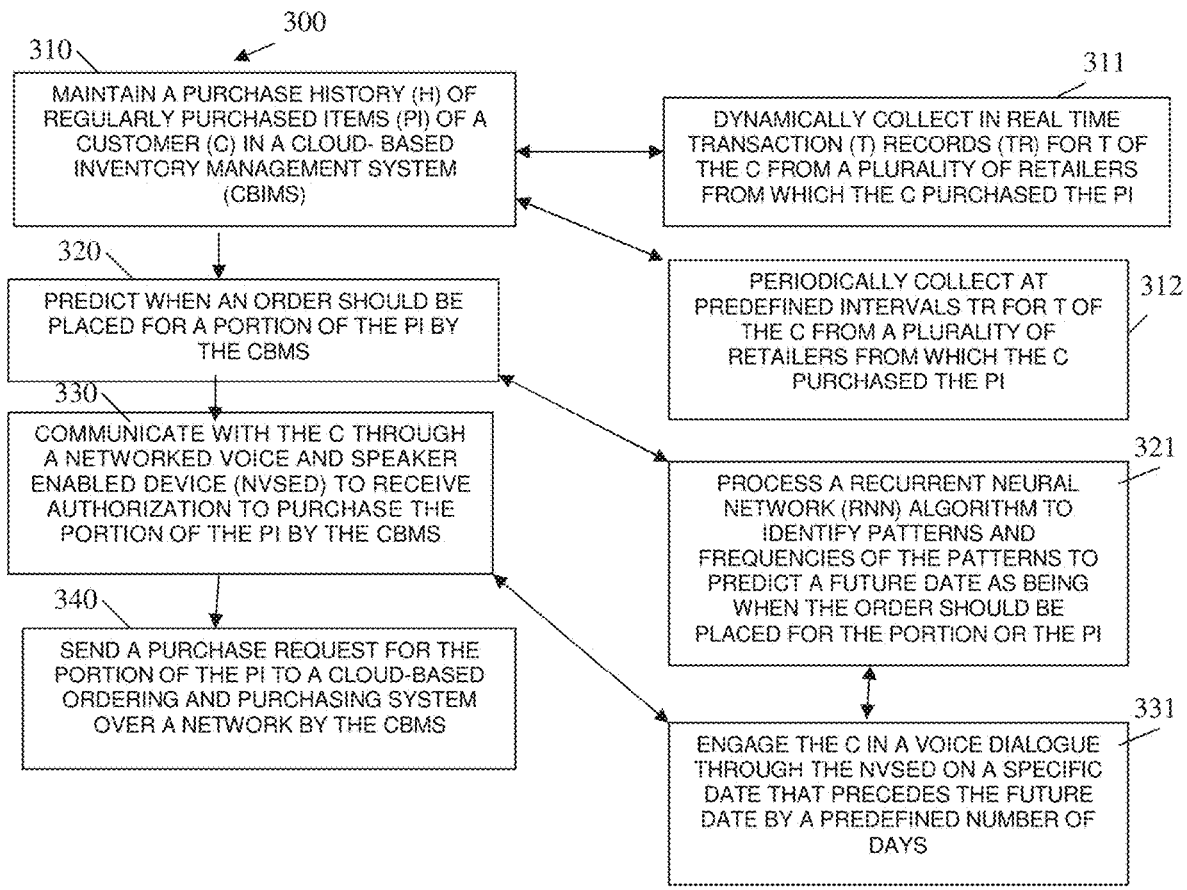
FIG. 3 is a diagram of another method for network-based inventory replenishment, according to an example embodiment.

These embodiments of the FIGS. 1A-1O are now discussed along with other embodiments with the discussion of the FIGS. 2-3.

FIG. 2 is a diagram of a method 200 for network-based inventory replenishment, according to an example embodiment. The software module(s) that implements the method 200 is referred to as an "inventory replenishment manager." The inventory replenishment manager is implemented as executable instructions programmed and residing within memory and/or a non-transitory computer-readable (processor-readable) storage medium and executed by one or more hardware processors of a hardware computing device. The processors of the device that executes the inventory replenishment manager are specifically configured and programmed to process the inventory replenishment manager. The inventory replenishment manager has access to one or more networks during its processing. The networks can be wired, wireless, or a combination of wired and wireless.

In an embodiment, the device that executes the inventory replenishment manager is a single device or set of devices that process in a cloud processing environment.

In an embodiment, the device that executes the inventory replenishment manager is a server.

In an embodiment, the inventory replenishment manager is some combination of or all of: the inventory replenishment application 120 and the APIs 131 of the Omni-Channel platform 130.

In an embodiment, the inventory replenishment manager processes a RNN algorithm for analyzing and predicting item replenishment needs of a specific consumer.

In an embodiment, the inventory replenishment manager processes transaction data for transactions of the consumer using the approaches discussed above in the FIGS. 1B-1O for predicting item replenishment needs of a specific consumer.

The inventory replenishment manager can dynamically obtain and/or dynamically maintain the consumer's transaction data in the manners discussed above with the FIG. 1A.

At 210, the inventory replenishment manager analyzes a history of items for a consumer. That is, the consumer's consumption of the items are identified. This can be done in any of the manners discussed above with the FIGS. 1A-1O.

According to an embodiment, at 211, the inventory replenishment manager analyzes transaction records for transactions where the consumer made purchases of the items. The inventory replenishment manager then derives a pattern of consumption for the consumer with respect to a specific item.

In an embodiment of 211 and at 212, the inventory replenishment manager identifies a frequency with which the specific item is purchased by the consumer from the pattern. The frequency provides a timing (date based timing) with which the consumer purchases the item for replenishment and further consumption by the consumer.

At 220, the inventory replenishment manager predicts based on the analyzed history a specific item that is in need of replenishment by the consumer. This prediction provides a date in which it is likely that the consumer will need the item to replenish the item based on the consumer's consumption pattern with respect to the item.

In an embodiment of 212 and 220, at 221, the inventory replenishment manager identifies a next date in the future with which the pattern of purchasing the specific item is likely to occur.

At 230, the inventory replenishment manager notifies the consumer of the specific item and the need to order the specific item for replenishment of the consumer's inventory for the item.

In an embodiment of 221 and 230, at 231, the inventory replenishment manager notifies the consumer of the specific being in need of replenishment within a configurable or predefined number of days that precedes the next date.

In an embodiment, at 222, the inventory replenishment manager notifies the consumer that the specific item was automatically ordered with a provider of the item based on a profile maintained for the consumer that authorizes automatic replenishment of the specific item with the provider.

In an embodiment, at 223, the inventory replenishment manager requests permission from the consumer to automatically order the specific item with a provider for deliver to or pick up by the consumer.

According to an embodiment, at 230, the inventory replenishment manager engages the consumer for ordering the specific item over one or more of: a voice communication channel, a VR communication channel, a video-gesture based communication channel, a web-based communication channel, and a text-based communication channel. Examples of these types of communication channel engage were provided above with respect to the description of the FIG. 1A.

In an embodiment of 230 and at 231, the inventory replenishment manager completes a purchase transaction between the consumer and a provider of the specific item.

In an embodiment of 231 and at 232, the inventory replenishment manager provides the consumer a date, a time, and a location for pickup of the specific item or deliver of the specific item as communicated to the inventory replenishment manager from the provider when the transaction is completed on behalf of the consumer by the inventory replenishment manager.

In an embodiment, at 240, the inventory replenishment manager engages the consumer for ordering a different item that is analyzed from the history to also be in need of replenishment within a configurable number of days beyond a date that the consumer is notified of the specific item. For example, if milk is the specific item but bananas are in need of replenishment a few days after the milk than the inventory replenishment manager suggests replenishment of the bananas with the milk.

In an embodiment, at 250, the inventory replenishment manager notifies the consumer of an offer for a different item made by a third-party based on a same type for the specific item and the different item but the different item provided by a different manufacturer than a manufacturer of the specific item. For example, if the specific item is green beans and the consumer typically buys brand X but the store has a special on brand Y, then the inventory replenishment manager suggest that the consumer try brand Y to enjoy a discount on the green beans.

FIG. 3 is a diagram of another method 300 for network-based inventory replenishment, according to an example embodiment. The software module(s) that implements the method 300 is referred to as an "item purchase predictor." The item purchase predictor is implemented as executable instructions programmed and residing within memory and/ or a non-transitory computer-readable (processor-readable) storage medium and executed by one or more hardware processors of a hardware device. The processors of the device that executes the item purchase predictor are specifically configured and programmed to process item purchase predictor. The item purchase predictor has access to one or more networks during its processing. The networks can be wired, wireless, or a combination of wired and wireless.

In an embodiment, the device that executes the item purchase predictor is a single device or set of devices that process in a cloud processing environment.

In an embodiment, the device that executes the item purchase predictor is a server.

In an embodiment, the item purchase predictor is some combination of or all of: the inventory replenishment application 120, the APIs 131 of the Omni-Channel platform 130, and the method 200.

In an embodiment, the item purchase predictor processes a RNN algorithm for analyzing and predicting item replenishment needs of a specific consumer.

In an embodiment, the item purchase predictor processes transaction data for transactions of the consumer using the approaches discussed above in the FIGS. 1B-1O for predicting item replenishment needs of a specific consumer.

The item purchase predictor can dynamically obtain and/or dynamically maintain the consumer's transaction data in the manners discussed above with the FIG. 1A.

The item purchase predictor presents another and in some ways enhanced perspective of the method 200.

At 310, the item purchase predictor maintains a purchase history of regularly purchased items of a customer in a cloud-based inventory management system. In an embodiment, the cloud-based management system includes the inventory replenishment server having the inventory replenishment application 120.

In an embodiment, at 311, the item purchase predictor dynamically collets in real time transaction records for transactions of the customer from a plurality of retailers from which the customer purchased the regularly purchased items.

In an embodiment, at 312, the item purchase predictor periodically collecting at predefined intervals transaction records for transactions of the customer from a plurality of retailers from which the customer purchased the regularly purchased items.

At 320, the item purchase predictor predicts when an order should be placed for a portion of the regularly purchased items by the cloud-based inventory management system.

In an embodiment, at 321, the item purchase predictor processing a RNN algorithm to identify patterns and frequencies of the patterns to predict a future date as being when the order should be placed for the portion of the regularly purchased items.

At 330, the item purchase predictor communicates with the customer through a networked voice and speaker enabled device to receive authorization to purchase the portion of the regularly purchased items by the cloud-based inventory management system. In an embodiment, the networked voice and speaker enabled device is an Amazon Echo® device. In an embodiment, the networked voice and speaker enabled device is a Google Home® device. In an embodiment, the networked voice and speaker enabled device is an iWatch®. In an embodiment, the networked voice and speaker enabled device is a VR headset.

In an embodiment of 321 and 330, at 331, the item purchase predictor engages the consumer in a voice dialogue through the networked voice and speaker enabled device on a specific date that precedes the future date by a preconfigured number of days.

At 340, the item purchase predictor sends a purchase request for the portion of the regularly purchased items to a cloud-based ordering and purchasing system over a network by the cloud-based inventory management system.

Figure 4:
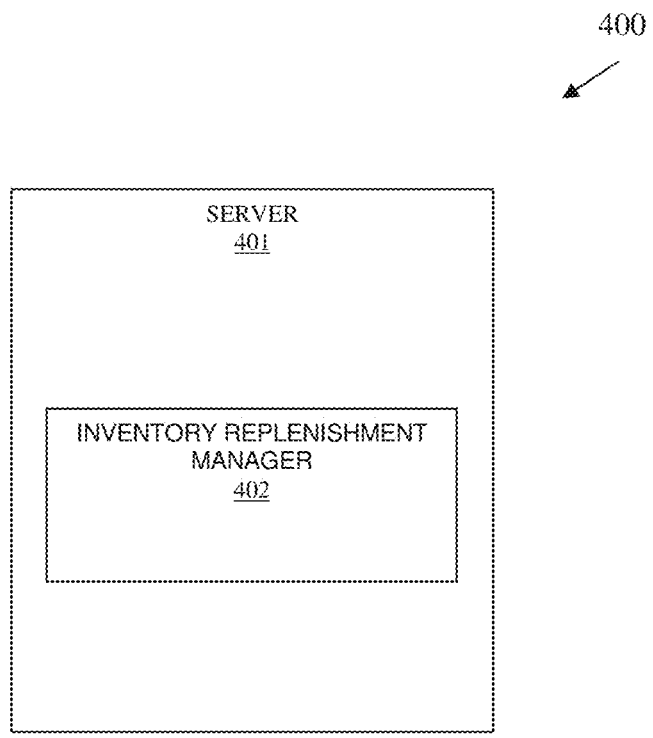
FIG. 4 is a diagram of another system service network-based inventory replenishment, according to an example embodiment.

FIG. 4 is a diagram of another system 400 service network-based inventory replenishment, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1A-1O and 2-3.

In an embodiment, the system 400 implements, inter alia, the method 200 of the FIG. 2.

In an embodiment, the system 400 implements, inter alia, the method 300 of the FIG. 3.

The system 400 includes a server 401 and the server including an inventory replenishment manager 402.

The inventory replenishment manager 402 is configured to: 1) execute on at least one hardware processor of the server 401; 2). predict when items are in need of replenishment based on consumption patterns for the items and frequencies of the consumption patterns for the items, (3) proactively engage a consumer to place an order for a subset of the items based on the consumption patterns and the frequencies derived for the consumer, and 4) place the order one behalf of the consumer upon consumer authorization for the order.

In an embodiment, the inventory replenishment manager 402 is further configured to: 5) notify the consumer of completion of the order that identifies a date, a time, and a location for pick up or delivery of the subset of items.

In an embodiment, the inventory replenishment manager 402 is further configured, in 3), to engage the consumer in an automated session over a communication channel that is one of: VR based, voice based, video-gesture based, text based, web based, and messaging application based.

In an embodiment, the inventory replenishment manager 402 is the method 200, the method 300, the processing discussed in the FIGS. 1A-1O, and/or some combination of these.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   analyzing, by executable instructions that are executed by at least one processor of a cloud processing environment, a history of items that were previously purchased by a consumer, wherein analyzing further includes analyzing the history as transaction records for transactions of the consumer, identifying a pattern for a specific purchase of a specific item from the transaction history, and identifying a frequency that the specific item is purchased from the pattern, wherein analyzing further includes identifying the pattern and the frequency by processing a Recurrent Neural Network (RNN) algorithm with machine learning that identifies time gaps between purchases made by the consumer and a non-linear sequence between the time gaps from the transaction records for the specific item;
   predicting, by the executable instructions, based on the analyzed history the specific item is in need of replenishment by the consumer by identifying a next date that the specific item is predicted to be purchased by the consumer based on the frequency and the pattern; and
   notifying, by the executable instructions, the consumer of the specific item, wherein notifying further includes:
   automatically ordering the specific item using an Application Programming Interface (API) with a provider of the specific item on behalf of the consumer when on a profile maintained for the consumer authorized automatic replenishment; and
   notifying the consumer that the specific item was automatically ordered with the provider when authorized by the profile.

2. The method of claim 1 further comprising, engaging the consumer for ordering the specific item over one or more of: a voice communication channel, a Virtual Reality (VR) communication channel, a video-gesture based communication channel, a web-based communication channel, and a text-based communication channel.

3. The method of claim 2 further comprising, completing a transaction between the consumer and the provider of the specific item.

4. The method of claim 3 further comprising, providing the consumer a date, a time, and a location for pickup of the specific item or delivery of the specific item as communicated from the provider when the transaction is completed on behalf of the consumer.

5. The method of claim 1 further comprising, engaging the consumer for ordering a different item that is analyzed from the history to be in need of replenishment within a configurable number of days beyond a date that the consumer is notified of the specific item.

6. The method of claim 1 further comprising, notifying the consumer of an offer for a different item provided by a third-party based on a same type for the specific item and the different item but the different item provided by a different manufacturer than a manufacturer of the specific item.

7. The method of claim 1, wherein notifying further includes requesting permission from the consumer to automatically order the specific item with the provider for delivery to or pick up by the consumer.

* * * * *